(12) United States Patent
Bonfigt et al.

(10) Patent No.: US 11,648,948 B2
(45) Date of Patent: May 16, 2023

(54) METHOD, APPARATUS, COMPUTER PROGRAM AND COMPUTER PROGRAM PRODUCT FOR DETERMINING A QUALITY CHARACTERISTIC, A VEHICLE-SPECIFIC FRICTION COEFFICIENT AND A FRICTION COEFFICIENT MAP

(71) Applicant: Bayerische Motoren Werke Aktiengesellschaft, Munich (DE)

(72) Inventors: Martin Bonfigt, Tuerkenfeld (DE); Barbara Bunk, Munich (DE); Andrew Mellett, Eching (DE); Reinhard Schmerer, Pipinsried (DE); Jeffrey Tchai, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 315 days.

(21) Appl. No.: 17/054,738

(22) PCT Filed: Jul. 16, 2019

(86) PCT No.: PCT/EP2019/069061
§ 371 (c)(1),
(2) Date: Nov. 11, 2020

(87) PCT Pub. No.: WO2020/048670
PCT Pub. Date: Mar. 12, 2020

(65) Prior Publication Data
US 2021/0221381 A1    Jul. 22, 2021

(30) Foreign Application Priority Data
Sep. 7, 2018    (DE) ..................... 10 2018 215 231.4

(51) Int. Cl.
*B60W 40/068* (2012.01)
*B60W 40/12* (2012.01)
*B60W 50/00* (2006.01)

(52) U.S. Cl.
CPC .......... *B60W 40/068* (2013.01); *B60W 40/12* (2013.01); *B60W 2050/0075* (2013.01);
(Continued)

(58) Field of Classification Search
CPC ............... B60W 40/068; B60W 40/12; B60W 2556/10; B60W 2552/40;
(Continued)

(56) References Cited

U.S. PATENT DOCUMENTS

2015/0203107 A1    7/2015  Lippman
2016/0133131 A1*   5/2016  Grimm ................ G08G 1/0141
                                                    701/117
(Continued)

FOREIGN PATENT DOCUMENTS

DE    10 2015 000 394 A1    7/2016
DE    10 2015 201 383 A1    7/2016
(Continued)

OTHER PUBLICATIONS

International Search Report (PCT/ISA/210) issued in PCT Application No. PCT/EP2019/069061 dated Oct. 28, 2019 with English translation (six (6) pages).
(Continued)

*Primary Examiner* — Behrang Badii
*Assistant Examiner* — Jay Khandpur
(74) *Attorney, Agent, or Firm* — Crowell & Moring LLP

(57) ABSTRACT

A method determines a quality characteristic, in which the quality characteristic is representative for the procurement of a vehicle-specific friction coefficient of a vehicle and a standardized friction coefficient of a friction coefficient map.
(Continued)

The friction coefficient data are received, the friction coefficient data being representative for a friction coefficient measured depending upon the position of a vehicle and a quality characteristic representative for the vehicle. The friction coefficient map is provided, the friction coefficient being representative for standardized friction coefficients of a vehicle fleet of a route network. Depending upon the friction coefficient data and the friction coefficient map, the quality characteristic is determined again and transmitted to the vehicle.

18 Claims, 3 Drawing Sheets

(52) U.S. Cl.
CPC ..... *B60W 2552/40* (2020.02); *B60W 2556/10* (2020.02); *B60W 2556/20* (2020.02); *B60W 2556/45* (2020.02)

(58) Field of Classification Search
CPC ..... B60W 2050/0075; B60W 2556/45; B60W 2555/20
See application file for complete search history.

(56) References Cited

U.S. PATENT DOCUMENTS

| | | |
|---|---|---|
| 2018/0170391 A1 | 6/2018 | Duvernier et al. |
| 2018/0293988 A1* | 10/2018 | Huang .................... G10L 17/20 |
| 2019/0001988 A1* | 1/2019 | Ienaga ............. G08G 1/096775 |
| 2019/0389475 A1* | 12/2019 | Jonasson .............. G08G 1/0112 |
| 2020/0362926 A1* | 11/2020 | Germer ................ B60K 17/344 |

FOREIGN PATENT DOCUMENTS

| | | | |
|---|---|---|---|
| DE | 10 2016 014 547 A1 | 7/2017 | |
| DE | 10 2016 209 831 A1 | 12/2017 | |
| DE | 10 2018 215 170 A1 | 3/2020 | |
| JP | 2008031945 A * | 2/2008 | .............. B60T 8/175 |

OTHER PUBLICATIONS

German-language Written Opinion (PCT/ISA/237) issued in PCT Application No. PCT/EP2019/069061 dated Oct. 28, 2019 (six (6) pages).

German-language Search Report issued in German Application No. 10 2018 215 231.4 dated May 13, 2020 with partial English translation (13 pages).

* cited by examiner

METHOD, APPARATUS, COMPUTER PROGRAM AND COMPUTER PROGRAM PRODUCT FOR DETERMINING A QUALITY CHARACTERISTIC, A VEHICLE-SPECIFIC FRICTION COEFFICIENT AND A FRICTION COEFFICIENT MAP

BACKGROUND AND SUMMARY OF THE INVENTION

The invention relates to a method, an apparatus, a computer program, and a computer program product for determining a quality characteristic. The invention furthermore relates to a method, an apparatus, a computer program, and a computer program product for determining a vehicle-specific friction coefficient. The invention furthermore relates to a method, an apparatus, a computer program, and a computer program product for determining a friction coefficient map.

There are warning maps in the prior art, on which route sections having low friction coefficients (for example, due to slippery ice) are displayed as a hazard warning. In particular for autonomous driving operation, it is advantageous if a vehicle is informed about friction coefficient conditions of a route section to be traveled. The friction coefficient is a dimensionless measure of the friction force in relation to the contact pressure force between two bodies, therefore the friction coefficient of a route section is different for every vehicle, since it is not only dependent on the road condition, but rather also, for example, on the tires and the weight of the vehicle.

The underlying object of the invention is to contribute to determining reliable vehicle-specific friction coefficients, for example, for an autonomous driving mode.

The object is achieved by the features of the independent claims. Advantageous designs are characterized in the dependent claims.

According to a first aspect, the invention is distinguished by a method for determining a quality characteristic, wherein the quality characteristic is representative of a relationship of a vehicle-specific friction coefficient of a vehicle and a standardized friction coefficient of a friction coefficient map. The invention is furthermore distinguished by an apparatus, wherein the apparatus is designed to execute the method for determining a quality characteristic.

In the method, friction coefficient data are received, wherein the friction coefficient data are representative of a friction coefficient measured in a position-dependent manner by a vehicle and of a quality characteristic representative of the vehicle. The friction coefficient map is provided, wherein the friction coefficient map is representative of standardized friction coefficients of a vehicle fleet of a route network. The quality characteristic is redetermined in dependence on the friction coefficient data and the friction coefficient map and the redetermined quality characteristic is transmitted to the vehicle.

In dependence on the quality characteristic, the vehicle can subsequently determine a vehicle-specific friction coefficient, as described in the second aspect, and use it, for example, for an autonomous driving mode.

By assigning an individual quality characteristic to the vehicle, it is possible to use a friction coefficient map having standardized friction coefficients for different vehicles, since each vehicle can convert a standardized friction coefficient into a vehicle-specific friction coefficient on the basis of its quality characteristic and, for example, a predetermined individual transfer function. Furthermore, the quality characteristic can be checked and adapted again and again and thus each vehicle can be trained on the standardized friction coefficient map.

According to a second aspect, the invention is distinguished by a method for determining a vehicle-specific friction coefficient of a vehicle. The invention is furthermore distinguished by an apparatus, wherein the apparatus is designed to carry out the method for determining a vehicle-specific friction coefficient of a vehicle.

In the method, a friction coefficient map is provided, wherein the friction coefficient map is representative of standardized friction coefficients of a vehicle fleet of a route network. A position of the vehicle is determined. A friction coefficient of a road section to be traveled is determined in dependence on the friction coefficient map and the position of the vehicle. A quality characteristic of the vehicle is provided. A vehicle-specific friction coefficient of the road section to be traveled is determined in dependence on the quality characteristic and the determined friction coefficient.

As described in the first aspect, due to the individual quality characteristic, a friction coefficient map having standardized friction coefficients can be used for different vehicles, since each vehicle can convert a standardized friction coefficient into a vehicle-specific friction coefficient on the basis of its quality characteristic and, for example, a predetermined individual transfer function.

The following optional designs apply both to the first aspect and also to the second aspect.

According to one optional design, the quality characteristic comprises a standard dimension with respect to the vehicle fleet, wherein the standard dimension is representative of how strongly a friction coefficient measured by the vehicle deviates from a standardized friction coefficient of the friction coefficient map.

A vehicle-specific friction coefficient may be determined very easily in particular in this way: A vehicle which measures lower friction coefficients on average than the standardized friction coefficient subsequently has to subtract an amount from a standardized friction coefficient to determine the vehicle-specific friction coefficient. Similarly, a vehicle which measures higher friction coefficients on average than the standardized friction coefficient subsequently has to add an amount to a standardized friction coefficient to determine the vehicle-specific friction coefficient.

According to a further optional design, the quality characteristic comprises a data sharpness, wherein the data sharpness is representative of how high an error bandwidth of a friction coefficient measurement of the vehicle is.

The data sharpness can be used in various ways. For example, in this way a massive intervention in the vehicle characteristic can be recognized (for example, due to a tire change). In this case, for example, the values of the quality characteristic are reset to initiate a new training of the vehicle.

According to a further optional design, the quality characteristic comprises a statistical confidence index, wherein the statistical confidence index is representative of how well the vehicle is trained on the friction coefficient map in relation to other vehicles of the vehicle fleet.

The statistical confidence index can be used, for example, for a high-quality friction coefficient map, for example, by incorporating friction coefficients of a well-trained vehicle with greater weight into the friction coefficient map.

According to a further optional design, the quality characteristic is representative of a Gaussian curve.

The standard dimension and the data sharpness may be easily determined in particular by means of a Gaussian function, i.e., a Gaussian curve. Since the standard dimension is visualized in a Gaussian curve by the phase shift and the spread, for example, by the variance.

According to a further optional design, the quality characteristic is assigned to a friction coefficient class.

A vehicle having a friction coefficient considered to be relatively high in wet conditions can have, for example, a friction coefficient considered to be relatively low on ice. It can therefore be advantageous to assign the quality characteristic to a friction coefficient class, such as for example, ice, snow, wet, high friction coefficient.

According to a third aspect, the invention is distinguished by methods for determining a friction coefficient map. The invention is furthermore distinguished by an apparatus, wherein the apparatus is designed to execute the method for determining a friction coefficient map.

In the method, a first friction coefficient map is provided, wherein the first friction coefficient map is representative of standardized friction coefficients of a first vehicle fleet of a route network. A second friction coefficient map is provided, wherein the second friction coefficient map is representative of standardized friction coefficients of a second vehicle fleet of the route network. In dependence on the first and second friction coefficient maps, a quality characteristic is determined, which is representative of a relationship of a friction coefficient of the first friction coefficient map to a friction coefficient of the second friction coefficient map. In dependence on the first friction coefficient map, the second friction coefficient map, and the quality characteristic, an overall friction coefficient map is determined.

The quality characteristic corresponds in principle to the quality characteristic of the first and second aspect, with the difference that it is representative of a relationship of a friction coefficient of the first friction coefficient map to a friction coefficient of the second friction coefficient map. However, the same principle may be applied to combine friction coefficient maps which were standardized differently. In this way, friction coefficient maps of different vehicle producers may be combined. The optional designs of the first and second aspect also apply to the quality characteristic of the third aspect.

According to a further aspect, the invention is distinguished by a computer program, wherein the computer program is designed to carry out the method of the first aspect, of the second aspect or of the third aspect.

According to a further aspect, the invention is distinguished by a computer program product which comprises an executable program code, wherein the program code executes the method of the first aspect, of the second aspect or of the third aspect upon execution by a data processing apparatus.

The computer program product in particular comprises a medium readable by the data processing apparatus, on which medium the program code is stored.

Exemplary embodiments of the invention are explained in greater detail hereinafter on the basis of the schematic drawings.

DETAILED DESCRIPTION OF THE DRAWINGS

Figure 1:
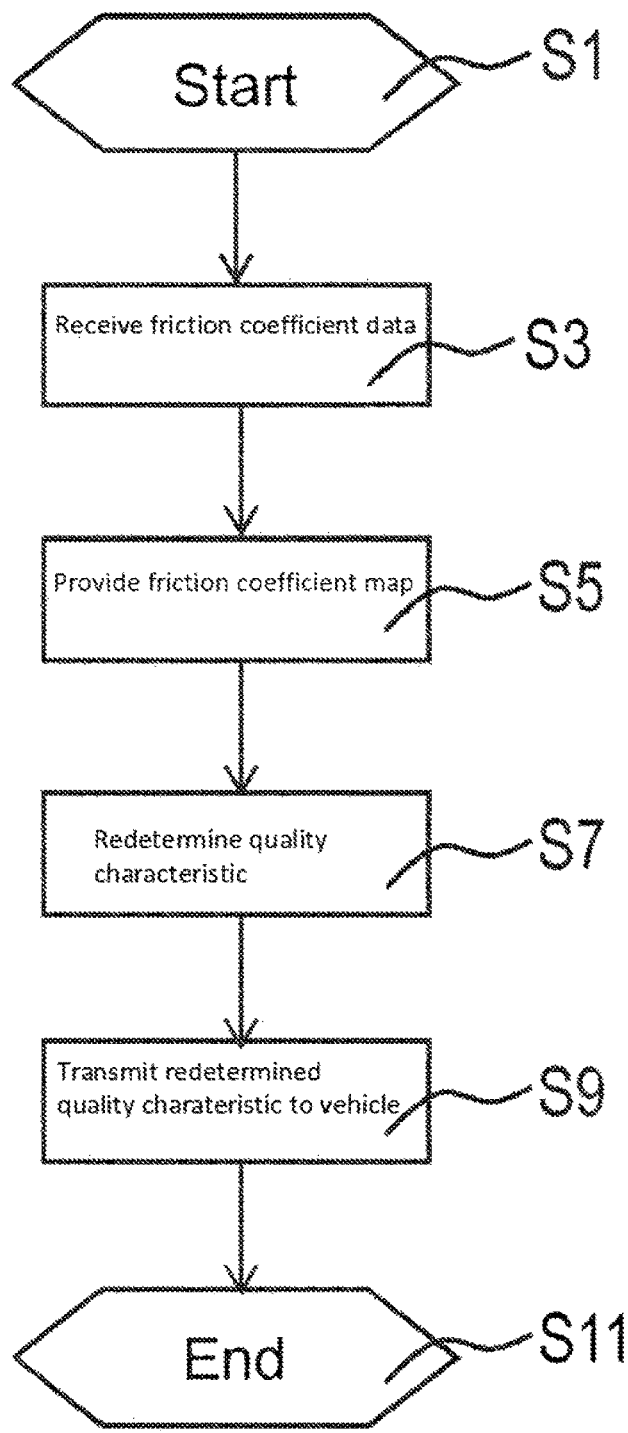
FIG. 1 shows a flow chart for determining a quality characteristic.

FIG. 1 shows a flow chart of a program for determining a quality characteristic.

The program can be processed by an apparatus. The apparatus is formed, for example, in a server and/or a backend.

The apparatus can also be referred to as an apparatus for determining a quality characteristic.

The apparatus has for this purpose in particular a processing unit, a program and data memory, and also, for example, one or more communication interfaces. The program and data memory and/or the processing unit and/or the communication interfaces can be formed in one module and/or distributed onto multiple modules.

For this purpose, in particular a program for determining a quality characteristic is stored on the program and data memory of the apparatus.

The program is started in a step S1, in which variables can optionally be initialized.

In a step S3, friction coefficient data are received, wherein the friction coefficient data are representative of a friction coefficient measured in a position-dependent manner by a vehicle and of a quality characteristic representative of the vehicle, wherein the quality characteristic is representative of a relationship of a vehicle-specific friction coefficient of the vehicle and a standardized friction coefficient of a friction coefficient map.

The friction coefficient measured in a position-dependent manner by the vehicle is determined, for example, in dependence on values of a sensor system of the vehicle, wherein the position is determined, for example, by means of GPS.

The standardized friction coefficient of a friction coefficient map is, for example, a measured mean friction coefficient of all vehicles of the vehicle fleet.

The quality characteristic is, for example, representative of a Gaussian curve. It comprises, for example, a standard dimension with respect to the vehicle fleet, wherein the standard dimension is representative of how strongly a friction coefficient measured by the vehicle deviates from a standardized friction coefficient of the friction coefficient map. This standard dimension is visualized in a Gaussian curve by the phase shift. The curve of a vehicle which measures lower friction coefficients on average than an average friction coefficient of all vehicles is shifted to the left. Similarly, the curve of a vehicle which measures higher friction coefficients on average than an average friction coefficient of all vehicles is shifted to the right. A high deviation from the standard value in no way means worse data quality. Rather, the deviation indicates vehicle properties, such as tire characteristics, chassis settings, or simply the vehicle model, which all influence the friction coefficient. In practice, a vehicle having a curve shifted to the left has worse traction than a vehicle having a curve shifted to the right. Based on these relationships, a vehicle-individual transfer function can be defined, which maps the individually measured friction coefficients on the standardized friction coefficient or vice versa. With the aid of this transfer function, each vehicle can accordingly convert the data of the friction coefficient map individually for itself.

The quality characteristic alternatively or additionally comprises a data sharpness, wherein the data sharpness is representative of how high an error bandwidth of a friction coefficient measurement of the vehicle is. This error bandwidth is dependent on how well the respective vehicle is already trained. The more segments a vehicle has traversed and the more reproducible its transfer function is determinable to be in comparison to many traversed segments in a backend, the sharper its vehicle-individual Gaussian curve becomes. The goal of the training is to describe every component of possible influences on the friction coefficient measurement as accurately as possible. In the event of a massive intervention in the vehicle characteristic (for example, tire change), the training algorithm recognizes a significant deviation of the measured friction coefficients in comparison to the expected friction coefficients which are predicted on the basis of the transfer function. In this case, the training is reset and begins again. A basic variance can be included in the spread, which basic variance results due to information fuzziness, for example, measurement inaccuracy, in the estimation of friction coefficients.

The quality characteristic alternatively or additionally comprises a statistical confidence index, wherein the statistical confidence index is representative of how well the vehicle is trained on the friction coefficient map in relation to other vehicles of the vehicle fleet. The better a vehicle is trained, the higher the confidence level is in this vehicle as an individual supplier of friction coefficients. For the algorithm, this means, for example, that the transmitted friction coefficients of a well-trained vehicle are weighted more strongly than the transmitted friction coefficients of a poorly trained vehicle. In this way, the data quality of the friction coefficient map is improved, since inaccurate values of poorly trained vehicles are hardly considered. In the best case, a vehicle is trained so well that traversing of a defined route section only by this vehicle already supplies reliable values.

Furthermore, the quality characteristic can be assigned to a friction coefficient class. A vehicle having a friction coefficient considered to be relatively high in wet conditions can have, for example, a friction coefficient considered to be relatively low on ice. It can therefore be advantageous to assign the quality characteristic to a friction coefficient class, for example, ice, snow, wet, high friction coefficient.

The friction coefficient data are allocated, for example, onto two data packets, wherein the friction coefficient itself is transmitted in a first data packet, for example, and one or more quality characteristic values are transmitted in a second data packet.

The friction coefficient data are transmitted continuously by the vehicle, for example.

In step S5, the friction coefficient map is provided, wherein the friction coefficient map is representative of standardized friction coefficients of a vehicle fleet of a route network.

The friction coefficient map is updated again and again in this case. A standardized friction coefficient of the friction coefficient map is, for example, a measured mean friction coefficient of all vehicles of the vehicle fleet.

In a step S7, the quality characteristic is redetermined in dependence on the friction coefficient data and the friction coefficient map.

In a step S9, the redetermined quality characteristic is transmitted to the vehicle. The transmission back does not take place for every received friction coefficient, for example. The redetermined quality characteristic is transmitted, for example, only shortly before the end of route planning at the route destination or at low frequency, for example, every 10 km.

They can subsequently be stored in the vehicle, for example, in encrypted form.

Subsequently, the program is ended in a step S11 and can optionally be started again in step S1.

Figure 2:
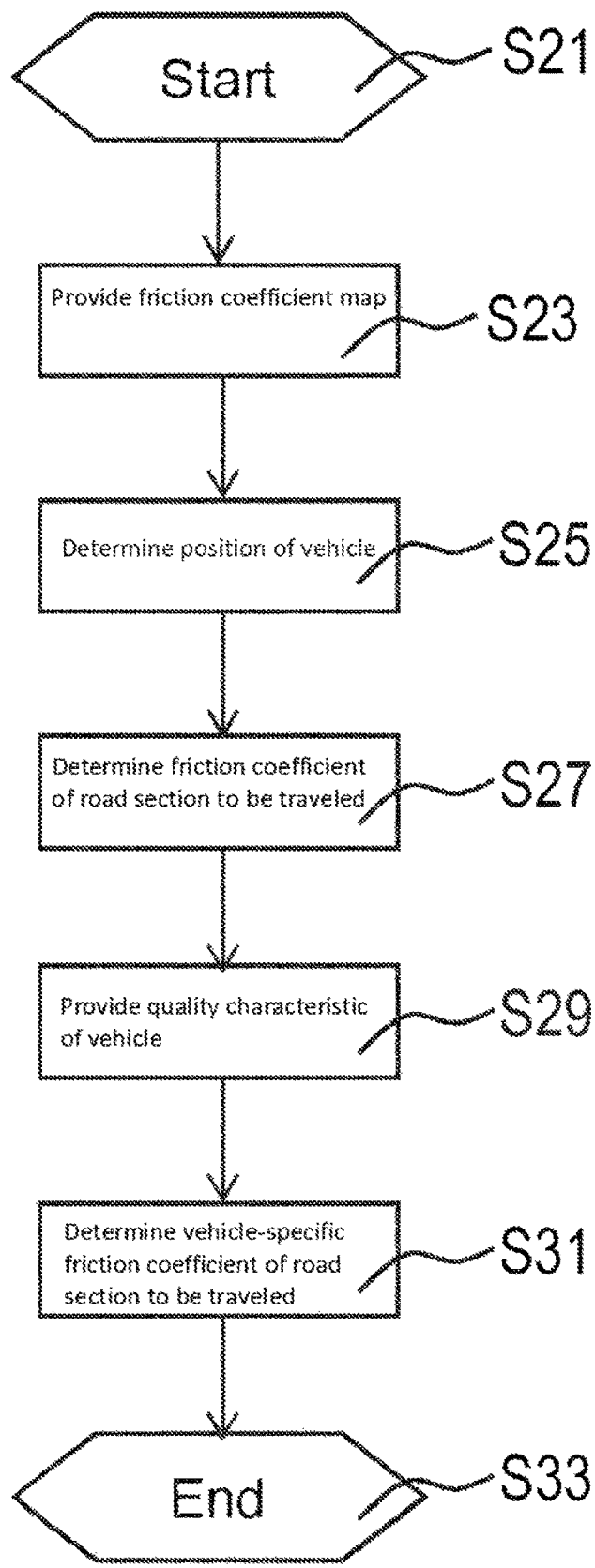
FIG. 2 shows a flow chart for determining a vehicle-specific friction coefficient of a vehicle.

The quality characteristic can subsequently be used by the vehicle, as shown in FIG. 2.

FIG. 2 shows a flow chart of a program for determining a vehicle-specific friction coefficient of a vehicle.

The program can be processed by an apparatus. The apparatus is formed, for example, in the vehicle.

The apparatus can also be referred to as an apparatus for determining a vehicle-specific friction coefficient of a vehicle.

The apparatus has for this purpose in particular a processing unit, a program and data memory, and also, for example, one or more communication interfaces. The program and data memory and/or the processing unit and/or the communication interfaces can be formed in one module and/or distributed onto multiple modules.

In particular, a program for determining a vehicle-specific friction coefficient of a vehicle is stored on the program and data memory of the apparatus for this purpose.

The program is started in a step S21, in which variables can optionally be initialized.

In a step S23, a friction coefficient map is provided, wherein the friction coefficient map is representative of standardized friction coefficients of a vehicle fleet of a route network.

In step S25, a position of the vehicle is determined.

In a step S27, a friction coefficient of a road section to be traveled is determined in dependence on the friction coefficient map and the position of the vehicle.

The friction coefficient corresponds, for example, to the standardized friction coefficient of the friction coefficient map at the position of the road section to be traveled.

In a step S29, a quality characteristic of the vehicle is provided. The quality characteristic corresponds, for example, to the last quality characteristic transmitted by the server (step S9 of FIG. 1).

In a step S31, a vehicle-specific friction coefficient of the road section to be traveled is determined in dependence on the quality characteristic and the determined friction coefficient. The vehicle-specific friction coefficient is determined, for example, by means of the above-described transfer function and the quality characteristic.

The vehicle-specific friction coefficient thus determined can subsequently be used, for example, for an autonomous driving mode.

Subsequently, the program is ended in a step S33 and can optionally be started again in step S21.

Figure 3:
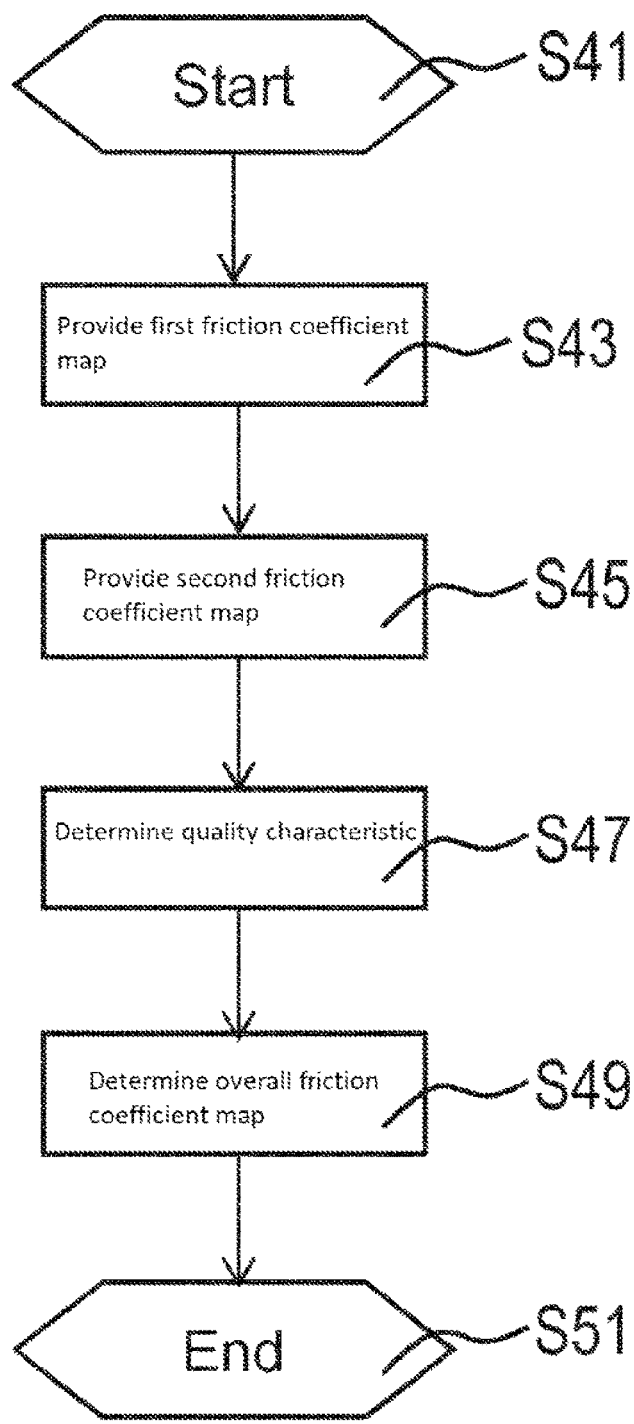
FIG. 3 shows a flow chart for determining a friction coefficient map.

FIG. 3 shows a flow chart of a program for determining a friction coefficient map.

The program can be processed by an apparatus. The apparatus is formed, for example, in the server and/or backend.

The apparatus can also be referred to as an apparatus for determining a friction coefficient map.

The apparatus has for this purpose in particular a processing unit, a program and data memory, and also, for example, one or more communication interfaces. The program and data memory and/or the processing unit and/or the communication interfaces can be formed in one module and/or distributed onto multiple modules.

In particular, a program for determining a friction coefficient map is stored on the program and data memory of the apparatus for this purpose.

The program is started in a step S41, in which variables can optionally be initialized.

In a step S43, a first friction coefficient map is provided, wherein the first friction coefficient map is representative of standardized friction coefficients of a first vehicle fleet of a route network.

In step S45, a second friction coefficient map is provided, wherein the second friction coefficient map is representative of standardized friction coefficients of a second vehicle fleet of the route network.

In a step S47, a quality characteristic is determined in dependence on the first and second friction coefficient map, which quality characteristic is representative of a relationship of a friction coefficient of the first friction coefficient map to a friction coefficient of the second friction coefficient map.

In a step S49, an overall friction coefficient map is determined in dependence on the first friction coefficient map, the second friction coefficient map and the quality characteristic.

The above principle of transfer function and quality characteristic may also be used for combining different standardized friction coefficient maps. For example, the data sharpness and the standard dimension are each determined over a number of road segments between friction coefficient maps to be exchanged and the transfer function is determined therefrom using identical characteristic values, such as the above-described quality characteristic. A transfer function can then be applied on the basis of the characteristic values, which enables standardization/destandardization of external friction coefficients (second friction coefficient map) with the standardized first friction coefficient map. An optimum data quality is thus ensured.

Subsequently, the program is ended in a step S51 and can optionally be started again in step S41.

In summary, the following advantages result due to the above methods:

Due to the self-learning and statistical nature of the algorithm according to the invention, high data availability and data quality are ensured.

A high data quality can be achieved in spite of a small vehicle fleet (even a small number of trips over a certain route segment results in reliable friction coefficients).

The friction coefficient map is continuously and dynamically improved and outlier values are put into context.

It is possible to combine friction coefficient maps having different standardization.

What is claimed is:

1. A method for determining a quality characteristic, wherein the quality characteristic is representative of a relationship of a vehicle-specific friction coefficient of a vehicle and a standardized friction coefficient of a friction coefficient map, the method comprising:
   receiving friction coefficient data, wherein the friction coefficient data are representative of a friction coefficient measured in a position-dependent manner by a vehicle and of a quality characteristic representative of the vehicle;
   providing a friction coefficient map, wherein the friction coefficient map is representative of standardized friction coefficients of a vehicle fleet of a route network;
   redetermining the quality characteristic in dependence on the friction coefficient data and the friction coefficient map; and
   transmitting the redetermined quality characteristic to the vehicle, wherein
   the quality characteristic comprises a standard dimension with respect to the vehicle fleet, and
   the standard dimension is representative of how strongly a friction coefficient measured by the vehicle deviates from a standardized friction coefficient of the friction coefficient map.

2. The method according to claim 1, wherein
the quality characteristic comprises a data sharpness, and
the data sharpness is representative of how high is an error bandwidth of a friction coefficient measurement of the vehicle.

3. The method according to claim 1, wherein
the quality characteristic comprises a statistical confidence index, and
the statistical confidence index is representative of how well the vehicle is trained on the friction coefficient map in relation to other vehicles of the vehicle fleet.

4. The method according to claim 1, wherein
the quality characteristic is representative of a Gaussian curve.

5. The method according to claim 1, wherein
the quality characteristic is assigned to a friction coefficient class.

6. A method for determining a vehicle-specific friction coefficient of a vehicle, the method comprising:
   providing a friction coefficient map, wherein the friction coefficient map is representative of standardized friction coefficients of a vehicle fleet of a route network;
   determining a position of the vehicle;
   determining a friction coefficient of a road section to be traveled in dependence on the friction coefficient map and the position of the vehicle;
   providing a quality characteristic of the vehicle;
   determining a vehicle-specific friction coefficient of the road section to be traveled in dependence on the quality characteristic and the determined friction coefficient, wherein
   the quality characteristic comprises a standard dimension with respect to the vehicle fleet, and
   the standard dimension is representative of how strongly a friction coefficient measured by the vehicle deviates from a standardized friction coefficient of the friction coefficient map.

7. The method according to claim 6, wherein
the quality characteristic comprises a data sharpness, and
the data sharpness is representative of how high is an error bandwidth of a friction coefficient measurement of the vehicle.

8. The method according to claim 6, wherein
the quality characteristic comprises a statistical confidence index, and
the statistical confidence index is representative of how well the vehicle is trained on the friction coefficient map in relation to other vehicles of the vehicle fleet.

9. The method according to claim 6, wherein
the quality characteristic is representative of a Gaussian curve.

10. The method according to claim 6, wherein
the quality characteristic is assigned to a friction coefficient class.

11. A method for determining a quality characteristic, wherein the quality characteristic is representative of a relationship of a vehicle-specific friction coefficient of a vehicle and a standardized friction coefficient of a friction coefficient map, the method comprising:
   receiving friction coefficient data, wherein the friction coefficient data are representative of a friction coefficient measured in a position-dependent manner by a vehicle and of a quality characteristic representative of the vehicle;

providing a friction coefficient map, wherein the friction coefficient map is representative of standardized friction coefficients of a vehicle fleet of a route network;

redetermining the quality characteristic in dependence on the friction coefficient data and the friction coefficient map; and transmitting the redetermined quality characteristic to the vehicle, wherein the quality characteristic comprises a statistical confidence index, and the statistical confidence index is representative of how well the vehicle is trained on the friction coefficient map in relation to other vehicles of the vehicle fleet.

12. The method according to claim 11, wherein the quality characteristic comprises a data sharpness, and the data sharpness is representative of how high is an error bandwidth of a friction coefficient measurement of the vehicle.

13. The method according to claim 11, wherein the quality characteristic is representative of a Gaussian curve.

14. The method according to claim 11, wherein the quality characteristic is assigned to a friction coefficient class.

15. A method for determining a vehicle-specific friction coefficient of a vehicle, the method comprising:

providing a friction coefficient map, wherein the friction coefficient map is representative of standardized friction coefficients of a vehicle fleet of a route network;

determining a position of the vehicle;

determining a friction coefficient of a road section to be traveled in dependence on the friction coefficient map and the position of the vehicle;

providing a quality characteristic of the vehicle;

determining a vehicle-specific friction coefficient of the road section to be traveled in dependence on the quality characteristic and the determined friction coefficient, wherein the quality characteristic comprises a statistical confidence index, and the statistical confidence index is representative of how well the vehicle is trained on the friction coefficient map in relation to other vehicles of the vehicle fleet.

16. The method according to claim 15, wherein the quality characteristic comprises a data sharpness, and the data sharpness is representative of how high is an error bandwidth of a friction coefficient measurement of the vehicle.

17. The method according to claim 15, wherein the quality characteristic is representative of a Gaussian curve.

18. The method according to claim 15, wherein the quality characteristic is assigned to a friction coefficient class.

* * * * *